(12) United States Patent
Arns

(10) Patent No.: US 9,929,390 B2
(45) Date of Patent: Mar. 27, 2018

(54) PASSENGER CAR WITH PROTECTION

(75) Inventor: Wilhelm Arns, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 1216 days.

(21) Appl. No.: 13/298,463

(22) Filed: Nov. 17, 2011

(65) Prior Publication Data

US 2012/0125703 A1    May 24, 2012

(30) Foreign Application Priority Data

Nov. 19, 2010    (DE) .................. 10 2010 051 745

(51) Int. Cl.
| | |
|---|---|
| *B60R 16/04* | (2006.01) |
| *H01M 2/10* | (2006.01) |
| *B60K 1/04* | (2006.01) |
| *B60L 3/00* | (2006.01) |
| *B60L 11/12* | (2006.01) |
| *B60L 11/18* | (2006.01) |

(52) U.S. Cl.
CPC ............ *H01M 2/1083* (2013.01); *B60K 1/04* (2013.01); *B60L 3/0007* (2013.01); *B60L 3/0046* (2013.01); *B60L 11/126* (2013.01); *B60L 11/1879* (2013.01); *B60K 2001/0416* (2013.01); *B60L 2240/545* (2013.01); *B60Y 2306/01* (2013.01); *Y02T 10/6217* (2013.01); *Y02T 10/7005* (2013.01); *Y02T 10/705* (2013.01); *Y02T 10/7077* (2013.01)

(58) Field of Classification Search
CPC . B60K 1/04; B60K 6/28; B60K 6/405; B60K 2001/0416; B60K 2001/0438; B60K 2001/045; B62D 25/087; B62D 25/2027; B60R 16/04; H01M 2/1083; B60L 11/126; B60L 11/1879; B60L 11/12; B60L 11/18

USPC ....... 180/68.5, 65.1, 65.22, 69.2, 69.1, 89.1, 180/89.11, 311; 296/203.04, 193.08, 204, 296/54.4, 37.16; 903/951, 952
See application file for complete search history.

(56) References Cited

U.S. PATENT DOCUMENTS

| | | | | |
|---|---|---|---|---|
| 4,317,497 | A | * | 3/1982 | Alt et al. ..................... 180/68.5 |
| 5,392,873 | A | * | 2/1995 | Masuyama et al. ......... 180/68.5 |
| 5,501,289 | A | * | 3/1996 | Nishikawa ............... B60K 1/04 180/65.1 |
| 5,585,205 | A | * | 12/1996 | Kohchi .......................... 429/99 |
| 6,520,552 | B2 | | 2/2003 | Schroeter et al. |

(Continued)

FOREIGN PATENT DOCUMENTS

| | | |
|---|---|---|
| DE | 10 2009 043 388 | 5/2010 |
| DE | 10 2009 007 035 A | 8/2010 |

(Continued)

OTHER PUBLICATIONS

Derhenkel et al. "Sicke" [Embossment] in http://de.Wikipedia.org.

(Continued)

*Primary Examiner* — James M Dolak
(74) *Attorney, Agent, or Firm* — Henry M. Feiereisen LLC

(57) ABSTRACT

A passenger car includes a body having two opposite wheel wells and a electric energy source which is arranged between two the wheel wheels for supply of electric energy. A protection made of steel sheet is arranged above the electric energy source and has depressions which extend in a direction from one of the wheel wells to another one of the wheel wells.

14 Claims, 4 Drawing Sheets

(56) References Cited

U.S. PATENT DOCUMENTS

| | | | |
|---|---|---|---|
| 6,622,809 B2* | 9/2003 | Takahashi | B60K 1/04 180/68.5 |
| 6,662,891 B2* | 12/2003 | Misu et al. | 180/68.1 |
| 7,021,412 B2* | 4/2006 | Koike et al. | 180/68.5 |
| 7,025,160 B2* | 4/2006 | Awakawa | 180/68.5 |
| 7,051,825 B2* | 5/2006 | Masui et al. | 180/68.5 |
| 7,290,811 B1 | 11/2007 | Arns | |
| 7,357,432 B2 | 4/2008 | Roll et al. | |
| 7,407,206 B2 | 8/2008 | Arns et al. | |
| 7,543,866 B2 | 6/2009 | Arns | |
| 7,568,755 B2* | 8/2009 | Imada | B62D 21/152 296/187.11 |
| 7,654,351 B2* | 2/2010 | Koike et al. | 180/68.5 |
| 7,690,686 B2* | 4/2010 | Hashimura et al. | 280/782 |
| 7,717,207 B2* | 5/2010 | Watanabe et al. | 180/68.5 |
| 7,748,775 B2 | 7/2010 | Mercurio | |
| 7,921,951 B2* | 4/2011 | Watanabe | B60K 1/04 180/68.5 |
| 7,967,093 B2* | 6/2011 | Nagasaka | 180/68.5 |
| 8,186,468 B2* | 5/2012 | Parrett et al. | 180/68.1 |
| 8,256,552 B2* | 9/2012 | Okada | 180/68.5 |
| 8,302,716 B2* | 11/2012 | Yoda | 180/68.5 |
| 8,446,035 B2* | 5/2013 | Tsuchiya et al. | 307/9.1 |
| 8,496,081 B2* | 7/2013 | Meier et al. | 180/68.5 |
| 8,505,662 B2* | 8/2013 | Schwarz et al. | 180/68.5 |
| 8,584,779 B2* | 11/2013 | Tsuchiya et al. | 180/68.5 |
| 8,783,402 B2* | 7/2014 | Ogihara | B60L 11/1877 180/68.5 |
| 8,794,365 B2* | 8/2014 | Matsuzawa | B60K 1/04 180/65.21 |
| 8,973,979 B2* | 3/2015 | Oezkan | B62D 25/20 296/193.07 |
| 9,156,340 B2* | 10/2015 | van den Akker | B60K 1/04 |
| 9,281,505 B2* | 3/2016 | Hihara | B60K 1/04 |
| 9,579,986 B2* | 2/2017 | Bachir | B60L 11/1822 |
| 9,656,694 B2* | 5/2017 | Terashima | B62D 21/152 |
| 9,728,809 B2* | 8/2017 | Inagaki | H01M 10/0567 |
| 9,758,029 B2* | 9/2017 | Hokazono | B60K 1/04 |
| 9,764,629 B2* | 9/2017 | Schmalzrieth | B60K 1/04 |
| 2002/0093246 A1 | 7/2002 | Takahashi | |
| 2005/0109433 A1* | 5/2005 | Danger | B62D 25/00 148/533 |
| 2007/0238015 A1* | 10/2007 | Kubota et al. | 429/120 |
| 2008/0196957 A1 | 8/2008 | Koike et al. | |

FOREIGN PATENT DOCUMENTS

| | | |
|---|---|---|
| EP | 601 28 619 | 11/2001 |
| JP | 2004-243882 | 8/2004 |

OTHER PUBLICATIONS

M. Scharper "Grundlagen der Werkstofftechnik" [Basics of Material Technology], in 4. Moderne Stahlwerkstoffe und deren Anwendung, pp. 1-52.

* cited by examiner

PASSENGER CAR WITH PROTECTION

CROSS-REFERENCES TO RELATED APPLICATIONS

This application claims the priority of German Patent Application, Serial No. 10 2010 051 745.3, filed Nov. 19, 2010, pursuant to 35 U.S.C. 119(a)-(d), the content of which is incorporated herein by reference in its entirety as if fully set forth herein.

BACKGROUND OF THE INVENTION

The present invention relates to a passenger car.

The following discussion of related art is provided to assist the reader in understanding the advantages of the invention, and is not to be construed as an admission that this related art is prior art to this invention.

Hybrid technology gains increasingly more importance in the automobile industry. In generally, the term "hybrid" as used in drive technology relates to a combination of different types or processes for driving a system. When drive technology for automobiles is involved, vehicles are referred to which have at least two energy converters and two energy storage systems for propulsion. Examples of energy converters include conventional combustion engines or increasingly popular electric motors. Energy stores normally involve fuel tanks and additional accumulators.

Hybrid electric vehicles thus include for example passenger cars with an electric motor and a combustion engine as energy converters and an accumulator and a fuel tank as energy store. The accumulators are normally lithium-ions-accumulators or nickel-metal hybrid accumulators. The typical accumulator has a box-shaped configuration. The weight proportion of accumulators in passenger cars ranges between 10% and about 40%, amounting to possibly several hundreds kilograms. As a consequence of their substantial weight, accumulators are installed in a lower vehicle area so that the center of gravity of the vehicle is low. A possible position involves for example a placement on the trunk floor behind the rear bench between the wheel wells.

Accumulators which are mounted between the wheel wells can be deformed, when in the event of a crash from the side the spacing between the wheel wells excessively decreases. A mechanically damaged accumulator poses a significant risk potential. In case of damage, internal shorting may be encountered that may cause the housing of the accumulator to melt. The high voltage poses also an acute fire hazard. Damaged accumulators may also cause smoldering fires that may lead to a fire after a certain time interval by way of smoke ignition.

It would therefore be desirable and advantageous to provide an improved passenger car to obviate prior art shortcomings and to provide protection of an electric energy source such as an accumulator, against mechanical damage in the event of an accident or also from the load in the trunk for safety reasons.

SUMMARY OF THE INVENTION

According to one aspect of the present invention, a passenger car includes a body having two opposite wheel wells, an electric energy source arranged between the two wheel wells for supply of electric energy, and a protection made of steel sheet and arranged above the electric energy source, wherein the protection has depressions extending in a direction from one of the wheel wells to another one of the wheel wells.

According to another advantageous feature of the present invention, the electric energy source can be positioned in the trunk of the vehicle and covered by the protection. The protection can be secured in a way as to be prevented from touching the electric energy source. This allows adequate air circulation to protect the electric energy source against overheating.

It is to be understood by persons skilled in the art that the term "electric energy source" is used here in a generic sense and may include any type of energy store, e.g. an accumulator, i.e. any device that is able to store energy and to release stored energy. Also an energy generator or energy converter may be conceivable as an electric energy source within the scope of the invention.

According to another advantageous feature of the present invention, the protection can be made of crimped metal plates. As the depressions extend in the direction from one wheel well to the other wheel well, forces are transmitted between the wheel wells via the protection and the buckling strength is increased in longitudinal direction of the depressions. As a result, the protection is stiffened even more so as to be able to oppose a decrease in the distance between the wheel wells in the event of a crash from the side and thus to prevent damage to the electric energy source.

According to another advantageous feature of the present invention, the depressions may have a maximum depth in a range from 10 to 20 times a sheet thickness of the protection.

According to another advantageous feature of the present invention, the protection can have rounded borders. Thus, there are no sharp edges. It is also possible to provide the protection with border-side sheet skirts, i.e. borders which are beveled or folded to provide a better protection against injury.

According to another advantageous feature of the present invention, the protection can be constructed to function virtually as a suspension cross-brace, resulting in a desired stiffening of the body. The protection can then be secured to suspension-strut domes. The torsional stiffness of the body is thereby enhanced, increasing the stress resistance. Stiffening the body has further benefits such as improved handling.

According to another advantageous feature of the present invention, the protection can have border-side flanges in surrounding relationship to the electric energy source. In this way, the protection can be detachably connected by a flanged connection with parts of the interior of the passenger car. The provision of a detachable connection is beneficial because the protection can easily be removed when repair is needed or in the event of damage. Advantageously, the flanges are configured and positioned in such a manner as to leave a clearance for the electric energy source.

According to another advantageous feature of the present invention, brackets can be arranged on the wheel wells for connection of the protection with the wheel wells. The connection can be established by a formfit and/or interference fit. Flanged connections for example may be used a connection elements.

According to another advantageous feature of the present invention, the protection can be mounted to a floor assembly of the body, with the electric energy source being arranged on the floor assembly. When combined with a connection to the wheel wells, the protection is fixed in a very stable way.

For ease of understanding, the following description relates to a Cartesian coordinate system. Starting from a zero point which lies in the center of an imaginary connecting line between front wheels of the passenger car, the X axis points in opposition to the travel direction of the passenger car, the Y axis points to the right, and the Z axis points upwards.

For example, two flanged connections may be provided on the side regions of the body in parallel relation to the Y axis and two connections may be provided on the floor assembly in the direction of or parallel to the X axis. In this way, the electric energy source is also protected against longitudinal impact.

According to another advantageous feature of the present invention, a support can be configured in one piece with the protection, with the protection being mounted to the floor assembly via the support. Advantageously, two supports may be provided on the front side and rear side of the protection to secure the protection with the floor assembly of the vehicle. The single-piece construction of the protection and support renders the need for joining operations and connectors moot. The single-piece construction thus results in a cost-efficient and time-saving production.

In order to provide a particularly bending-resistant support, the support may be provided with a collar. Also the presence of crimped depressions in the support may be conceivable. The depressions may be configured in both directions. The same applies for border-side collars.

According to another advantageous feature of the present invention, the support may have angled flanges for attachment of connection elements. The flanges may hereby be configured, for example, in parallel relation to the floor assembly of the passenger car, thereby expanding the contact surface and the introduction of greater forces.

According to another advantageous feature of the present invention, the protection can include at least one reinforcement plate which covers part of the depressions for stiffening the protection. As a result, the sections of the depressions become hollow profiles, thereby increasing the resistance against torsional forces and deformations. Advantageously, the reinforcement plate is connected non-detachably with the protection by a material joint, e.g. through spot welding.

The protection provides a partial or complete separation between the electric energy source and the remainder of the trunk so that the electric energy source is protected from utensils in the trunk.

According to another advantageous feature of the present invention, the reinforcement plate is secured to a bottom side of the protection so as to be invisible when viewed from above. Of course, it is also conceivable to attach the reinforcement plate to a top side of the protection.

According to another advantageous feature of the present invention, the protection may be made from a hot-formed and press-hardened material. Press-hardening of the material results in an end product having substantial yield strength of above 1000 MPa and a substantial tensile strength of above 1500 MPa. Such structures do not have a tendency to spring back and oftentimes are also labeled as ultra high-strength.

According to another advantageous feature of the present invention, the protection can be made from boron-alloyed steel. Boron-alloyed steels are especially suitable for press-hardening. Boron-alloyed steels exhibit high strength and good malleability. A further benefit is the option to provide slight sheet thicknesses as a result of the high strength, which is accompanied by material savings and cost-savings.

According to another advantageous feature of the present invention, the protection can have a plate-shaped configuration and may be flat with deep depressions. Suitably, the protection has a size and shape which conforms to the configuration of the electric energy source. It is also conceivable to use the protection to split the trunk into two regions, with one region provided for the electric energy source and another region provided for baggage. In this way, the entire top side of the energy source can not only be protected in transverse direction but also against local forces from the load of the trunk.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
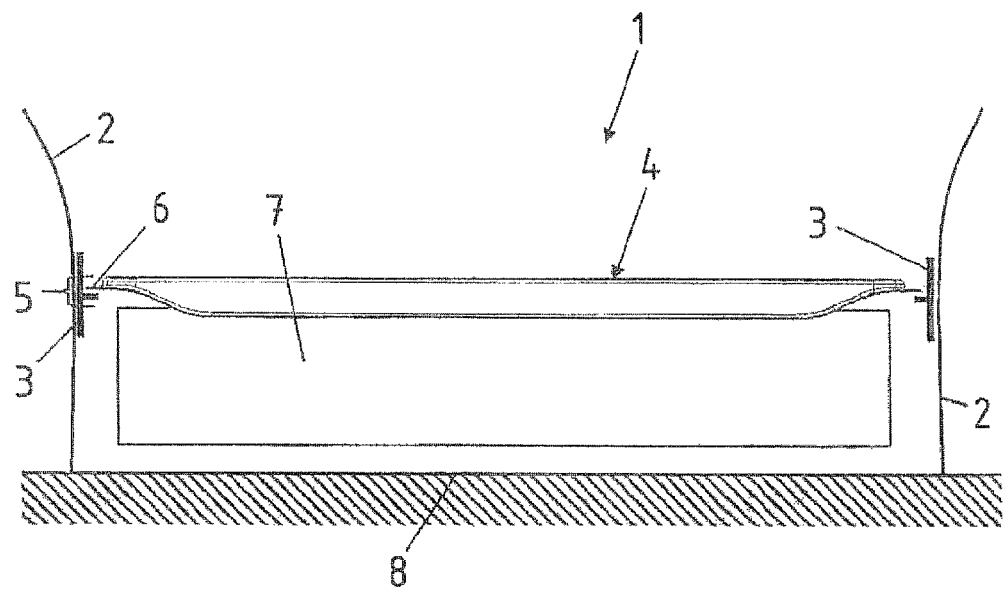
FIG. 1 is a rear view of a detail of a passenger car according to the present invention, equipped with a protection.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a rear view of a trunk area of a passenger car according to the present invention, generally designated by reference numeral 1. Wheel wells 2 are arranged in FIG. 1 to the left and right of the trunk in the direction of the Y axis in accordance with the coordinate system introduced above. Brackets 3 are mounted to the wheel wells 2 for connection of a protection 4 via a flanged connection 5, for example, as shown in FIG. 1. The protection 4 has lateral flanges 6 and can be made of steel sheet.

Located below the protection 4 is an electric energy source 7 for supply of electric energy. The electric energy source 7 is placed upon a floor assembly 8. As shown in FIG. 1, the protection 4 has a width which is greater than a width of the electric energy source 7.

Figure 2:
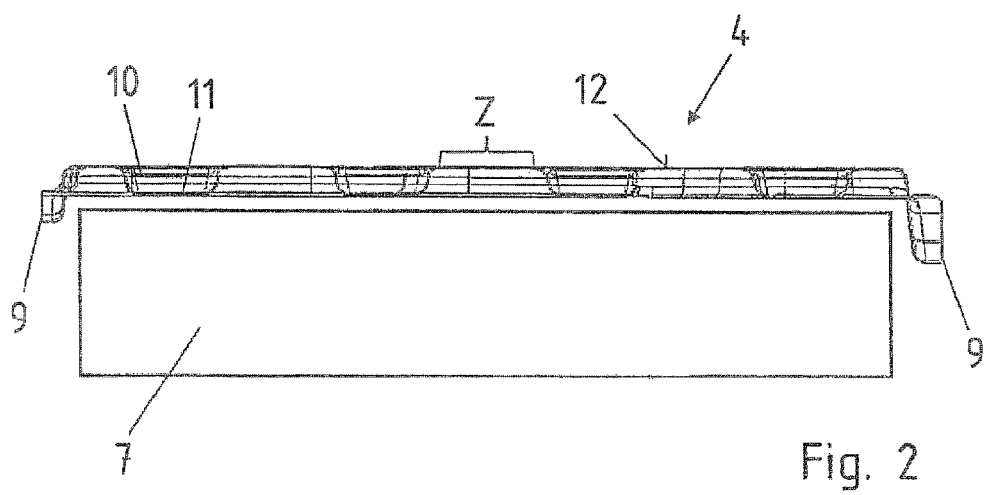
FIG. 2 a side view of the protection.

FIG. 2 shows a side view of the protection 4 above the electric energy source 7. The left and right sides of FIG. 2 show each sheet skirts 9 for arrangement of flanges according to a preferred embodiment of the invention in order to secure the protection 4. Furthermore, the protection 4 includes several depressions 10 of same depth. The respective base 11 of each depression 10 is flat and extends in parallel relation to a zone Z between the depressions 10. The base 11 of each depression 10 is positioned at a depth that is not deeper than 20 times the sheet thickness of the protection 4. The depressions 10 have a trapezoidal cross section. The end regions of both opposite sidewalls of the depressions 10 are rounded to merge with the upper surface 12 of the protection 4. The depressions 10 are spaced from one another by a distance which advantageously corresponds to the greatest depression width which corresponds to the zone Z.

Figure 3:
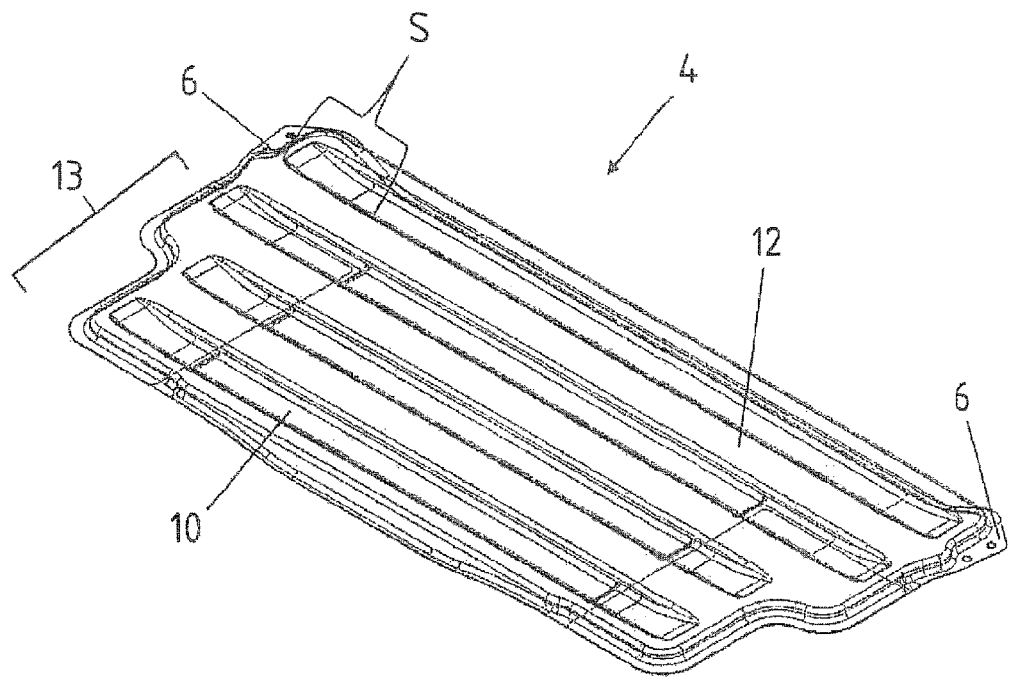
FIG. 3 a perspective view of the protection.

The perspective view of the protection 4 in FIG. 3 shows the flanges 6 at the border of the protection 4 for attachment to the brackets 3. Indicated by thin lines are reinforcement plates 13 which are placed onto the protection 4 at the bottom side thereof. The reinforcement plates 13 are positioned on the side of the protection 4 in opposition to the electric energy source 7 and stiffen the protection 4. The depressions 10 have different lengths to conform to the varying lengths of the respective regions of the protection 4. The base 11 of each of the depressions 10 ascends in an area of an end zone S until reaching the upper surface 12 of the protection 4.

Figure 4:
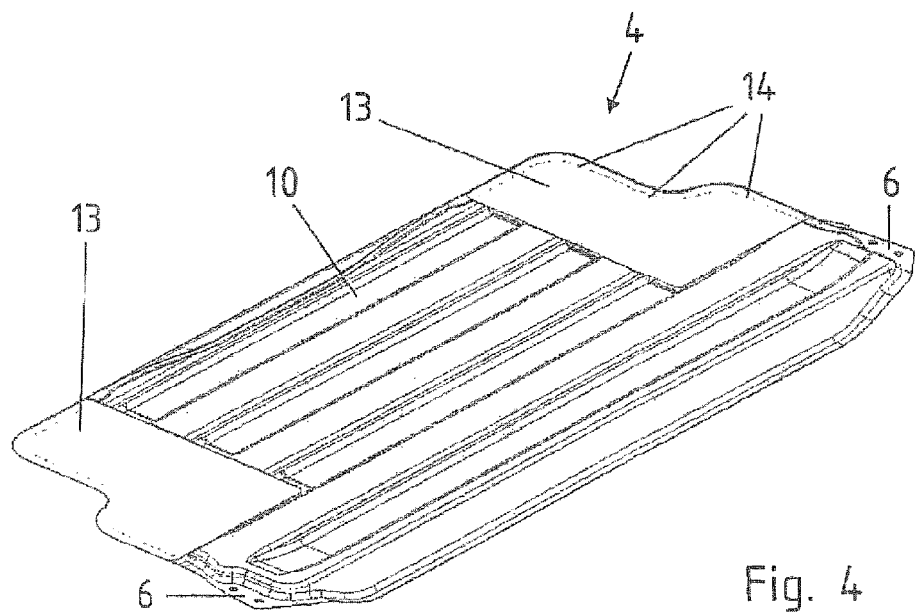
FIG. 4 a bottom perspective view of the protection of FIG. 3, equipped with reinforcement plates.

FIG. 4 is a bottom perspective view of the protection 4 of FIG. 3. The reinforcement plates 13 have a shape to conform to the borders of the protection 4. The dotted line indicates connection points 14 generated through spot welding. The reinforcement plates 13 are mounted flat on the bottom side of the protection 4. Ranges 6 are also shown and arranged on the wider side of the protection. The flanges 6 are each provided with two bores.

Figure 5:
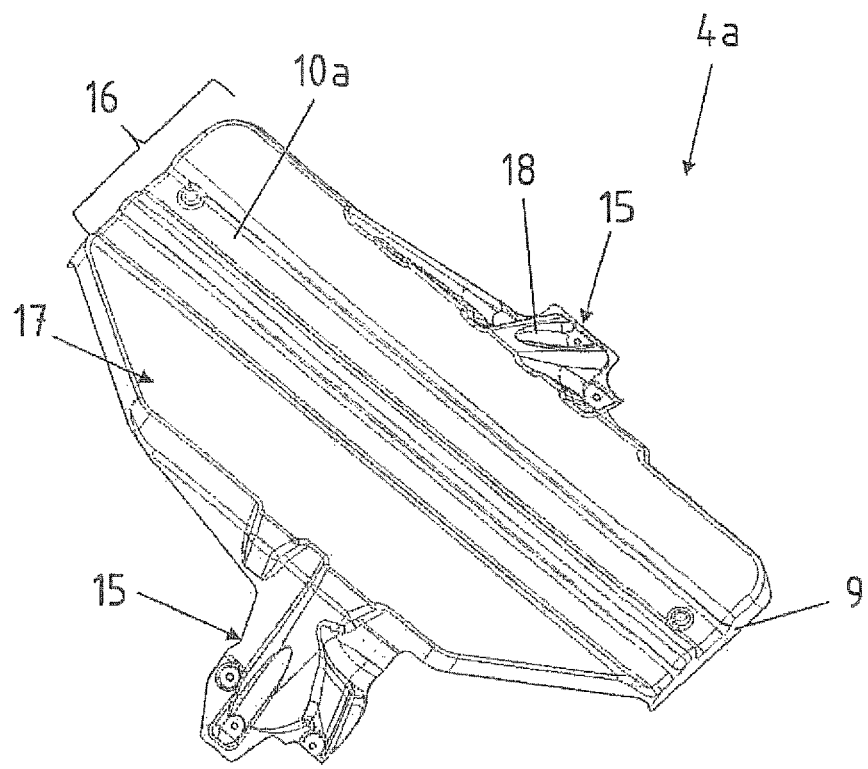
FIG. 5 a perspective view of a modification of a protection.

Referring now to FIG. 5, there is shown a perspective view of a modification of a protection, generally designated by reference numeral 4a. In this embodiment, the protection 4a has only two depressions 10a extending continuously from end to end. In other words, the length of the depressions 10a corresponds to the length of the protection 4a. The distance between the depressions 10a amounts roughly to half the greatest depression width. Supports 15 arranged behind one another in X direction are attached to the protection 4a. The protection 4a is subdivided into a main portion 16 with depressions 10a and into a trapezoidal portion 17. The supports 15 are provided to mount the protection 4a to a not shown floor assembly 8 (FIG. 1) of the vehicle body.

Figure 6:
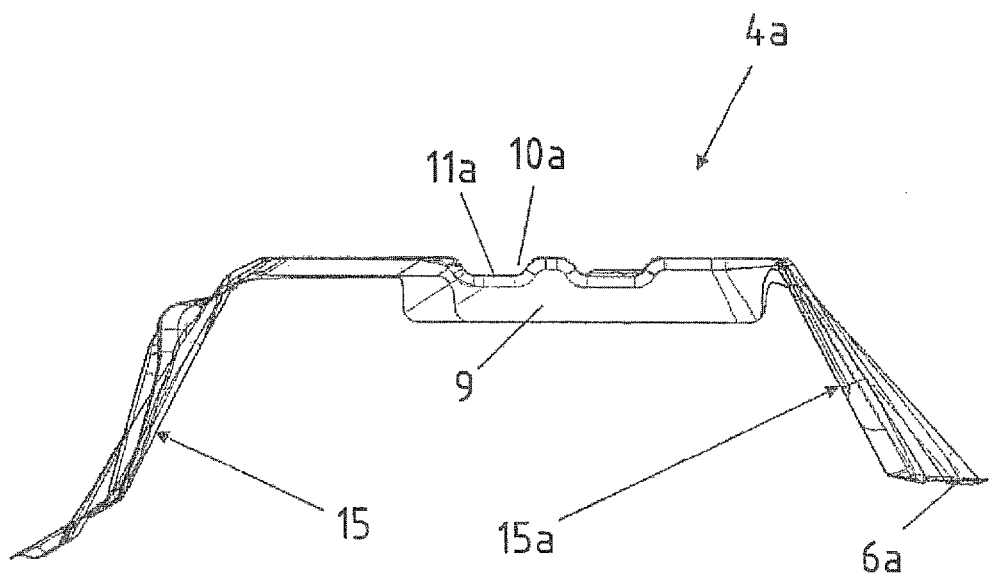
FIG. 6 a side view of the protection of FIG. 5.

As shown in FIG. 6, which is a side view of the protection 4a of FIG. 5, the protection 4a has flanges 6a which are angled so as to extend at an angle in relation to the top side of the protection 4a. This allows a simple and convenient securement. As shown in FIG. 5 the supports 15 are provided with crimped indentations 18 which extend in longitudinal direction of the supports 15.

As further shown in FIG. 6, the support 15 on the left hand side has a length which is longer than a length of the support, designated here by reference numeral 15a, on the right hand side. As a result, the protection 4a can be mounted also to floor assemblies 8 that are uneven. In the area of the depressions 10a up to the shorter support 15a, the protection 4a has an extended sheet skirt 9.

Figure 7:
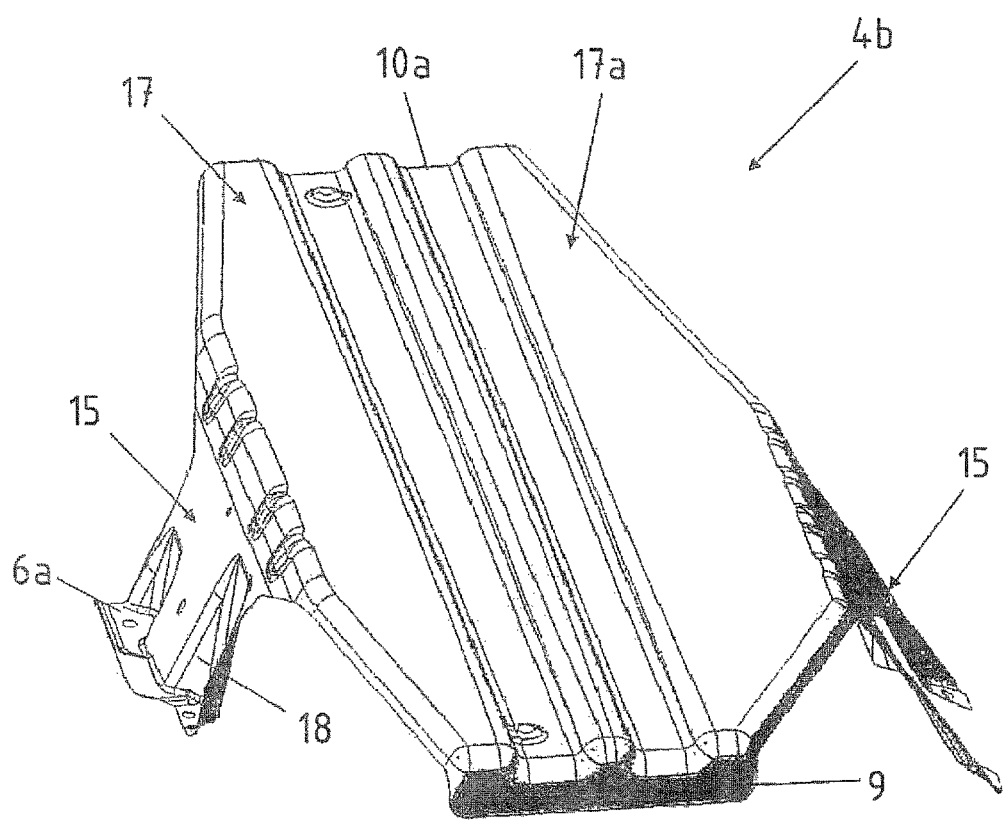
FIG. 7 a perspective view of another embodiment of a protection.

FIG. 7 shows a perspective view of another embodiment of a protection, generally designated by reference numeral 4b. Parts corresponding with those in FIG. 5 are denoted by identical reference numerals and not explained again. The description below will center on the differences between the embodiments. In this embodiment, the protection 4b is subdivided into a greater trapezoidal portion 17a and a smaller trapezoidal portion 17b with depressions 10a in-between. In contrast to FIG. 5, the protection 4b tapers on both sides in a direction towards the supports 15.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A passenger car, comprising:
    a body having two opposite wheel wells;
    an electric energy source arranged between the two wheel wells for supply of electric energy; and
    a protection made of steel sheet and arranged above the electric energy source, said protection having a flat top and bottom side and depressions having side walls and a bottom, said depressions forming a portion of the flat top side of the protection and extending in a direction from one of the wheel wells to another one of the wheel wells, said protection being connected to the wheel wells, wherein the protection is made from a hot-formed and press-hardened material.

2. The passenger car of claim 1, wherein the electric energy source is positioned in a trunk of the car and wherein the protection is arranged at a distance to the energy source and covers the energy source.

3. The passenger car of claim 1, wherein the depressions have a maximum depth in a range from 10 to 20 times a sheet thickness of the protection.

4. The passenger car of claim 1, wherein the protection has rounded borders.

5. The passenger car of claim 1, wherein the protection has border-side flanges in surrounding relationship to the electric energy source.

6. The passenger car of claim 1, further comprising brackets arranged on the wheel wells for connection of the protection with the wheel wells.

7. The passenger car of claim 1, wherein the protection is mounted to a floor assembly of the body, said electric energy source being arranged on the floor assembly.

8. The passenger car of claim 7, further comprising a support configured in one piece with the protection, said protection being mounted to the floor assembly via the support.

9. The passenger car of claim 8, wherein the support has angled flanges for securement of the protection.

10. The passenger car of claim 9, wherein the flanges extend in parallel relation to the floor assembly.

11. The passenger car of claim 1, wherein the protection includes at least one reinforcement plate which covers part of the depressions for stiffening the protection.

12. The passenger car of claim 11, wherein the reinforcement plate is secured to a bottom side of the protection so as to be invisible when viewed from above.

13. The passenger car of claim 1, wherein the protection has a plate-shaped configuration.

14. The passenger car of claim 1, wherein the protection is made from a boron-alloyed steel.

* * * * *